United States Patent [19]

Lusinchi et al.

[11] Patent Number: 4,868,498
[45] Date of Patent: Sep. 19, 1989

[54] ELECTRONIC ANGULAR MEASUREMENT DEVICE

[75] Inventors: Jean-Pierre Lusinchi, Saint Egreve; Jean-Michel Moreau, Grenoble, both of France

[73] Assignees: SGS-Thomson Microelectronics S.A., France; Marelli Autronica, Italy

[21] Appl. No.: 159,954

[22] Filed: Feb. 24, 1988

[30] Foreign Application Priority Data

Feb. 26, 1987 [FR] France ............................... 87 02549

[51] Int. Cl.$^4$ .............................................. G01D 5/20
[52] U.S. Cl. .................................. 324/173; 324/207; 324/179
[58] Field of Search ............... 324/207, 208, 160, 163, 324/166, 167, 173, 179; 361/239; 340/671, 870.31

[56] References Cited

U.S. PATENT DOCUMENTS

| | | | |
|---|---|---|---|
| 3,969,677 | 7/1976 | Woyton | 324/166 |
| 3,970,935 | 7/1976 | Beery | 324/166 |
| 4,446,427 | 5/1984 | Lovrenich | 324/207 |
| 4,514,690 | 4/1985 | Miller | 324/207 |
| 4,647,854 | 3/1987 | Yamada | 324/207 |
| 4,709,209 | 11/1987 | Murakami | 324/207 |

FOREIGN PATENT DOCUMENTS 46006 2/1982 European Pat. Off. .
2441173 6/1980 France .

*Primary Examiner*—Reinhard J. Eisenzopf
*Assistant Examiner*—Jose M. Solis
*Attorney, Agent, or Firm*—Lowe, Price, LeBlanc, Becker & Shur

[57] ABSTRACT

The invention relates to an angular measurement device comprising a variable reluctance magnetic circuit comprising a fixed portion (3) associated with a coil (2) and at least a moving element (4) attached to a part (5) rotating in front of the fixed portion, the angular position of which is to be detected, comprising: means (I) for integrating the voltage across the coil, means for measuring the instantaneous value of the integrated voltage (15), means for comparing this measure to a calibrating curve of the integrated voltage versus the angle.

6 Claims, 2 Drawing Sheets

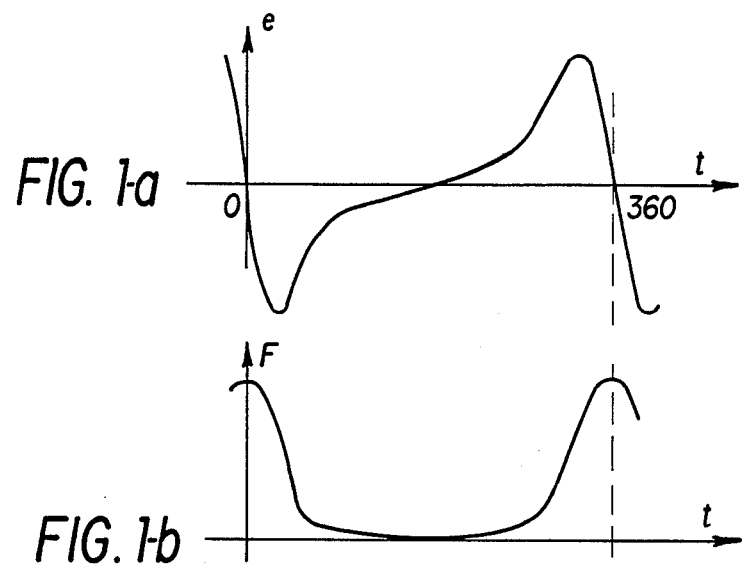
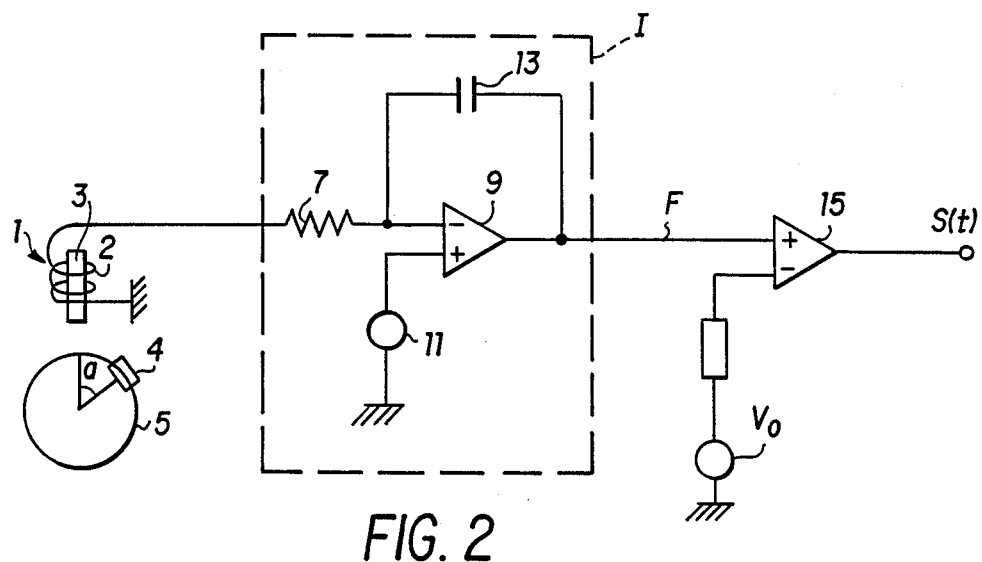

ELECTRONIC ANGULAR MEASUREMENT DEVICE

TECHNICAL FIELD

The invention relates to the angular detection of a rotating part by electronic means.

For the control of machine-tools, it is often necessary to determine the angular position of a rotating part in order to cause an operation in accordance with the measured position.

BACKGROUND OF THE INVENTION

In the state of the art, this function is for example carried out by a cam, or by an optical system decoding information contained on a disk fixed to the rotating part. On such a disk, at each angular position, is associated a coded information and the reading of this information directly provides the position of the part.

A drawback of the mechanical cam is that the reading of the position is purely mechanical and is accordingly not liable to be directly used by an electronic system. However, an electronic processing of information is necessary if one wishes to obtain sophisticated decisions and, for example, associate the information to other information provided by other measurement means.

The optical coded-areas measurement system presents the drawback to be expensive. The disk itself is not easy to make and the information reading necessitates sophisticated electronics. Generally, the information is coded by alternate transparent and dark areas on the disk and the reading thereof necessitates a directive light source and a reading means that is also directive. Such an implementation is not possible each time the rotative part is in a severe environment or when a cheap system is wished, or both.

An object of the instant invention is to provide for an electronic device for angular measurement providing a signal directly calibrated into angular values.

Another object of the invention is to provide for such a device using a very simple sensor.

SUMMARY OF THE INVENTION

For attaining those objects and others, the instant invention provides for an angular measurement method of a rotating part by means of a variable reluctance magnetic circuit comprising a fixed portion associated to a coil and at least one moving element attached to the rotating part, comprising the following steps: integrating the output signal of the sensor, tracing the integrated signal curve for one turn at a constant speed whereby each instantaneous amplitude of the integrated signal corresponds to an instantaneous angular value, and measuring for any speed, possibly variable, the instantaneous value of the integrated signal and deducing therefrom the corresponding angular value.

The invention also provides for an angular measurement device comprising a variable reluctance magnetic circuit comprising a fixed portion associated with a coil and at least one moving element attached to a part rotating in front of the fixed portion, the angular position of which is to be detected, comprising: means for integrating the voltage across the coil, means for measuring the instantaneous value of the integrated voltage, means for comparing this measure to a calibrating curve of the integrated voltage versus the angle.

According to an embodiment of the invention, the measurement means comprise means for comparing the integrated voltage to a reference value corresponding to a predetermined angle.

According to an embodiment of the instant invention, the angular measurement device comprises a plurality of fixed portions of a magnetic circuit at the periphery of the rotating part, each fixed portion being associated with at least one coil.

According to an embodiment of the invention, the device further comprises means for adding to the integrated voltage a signal proportional to the voltage across the coil, the proportionality ratio being for example chosen so that the added signal has at any time a value smaller than one tenth of the integrated voltage; however, this ratio can be chosen in different ways for specific applications.

According to an embodiment of the invention, this device comprises means for calibrating the integrated voltage curve by servocontrolling the reference voltage further to a comparison between the maximum value of the integrated voltage signal and an absolute reference voltage.

BRIEF DESCRIPTION OF THE DRAWINGS

Those objects, features and advantages, and others, of the instant invention will be explained in greater detail in the following description of preferred embodiments made in connection with the attached drawings wherein:

FIGS. 1A and 1B show signal curves as a function of time for explaining the operation of the device according to the invention;

FIG. 2 schematically shows a basic embodiment of the instant invention; and

DETAILED DESCRIPTION

Figure 3:
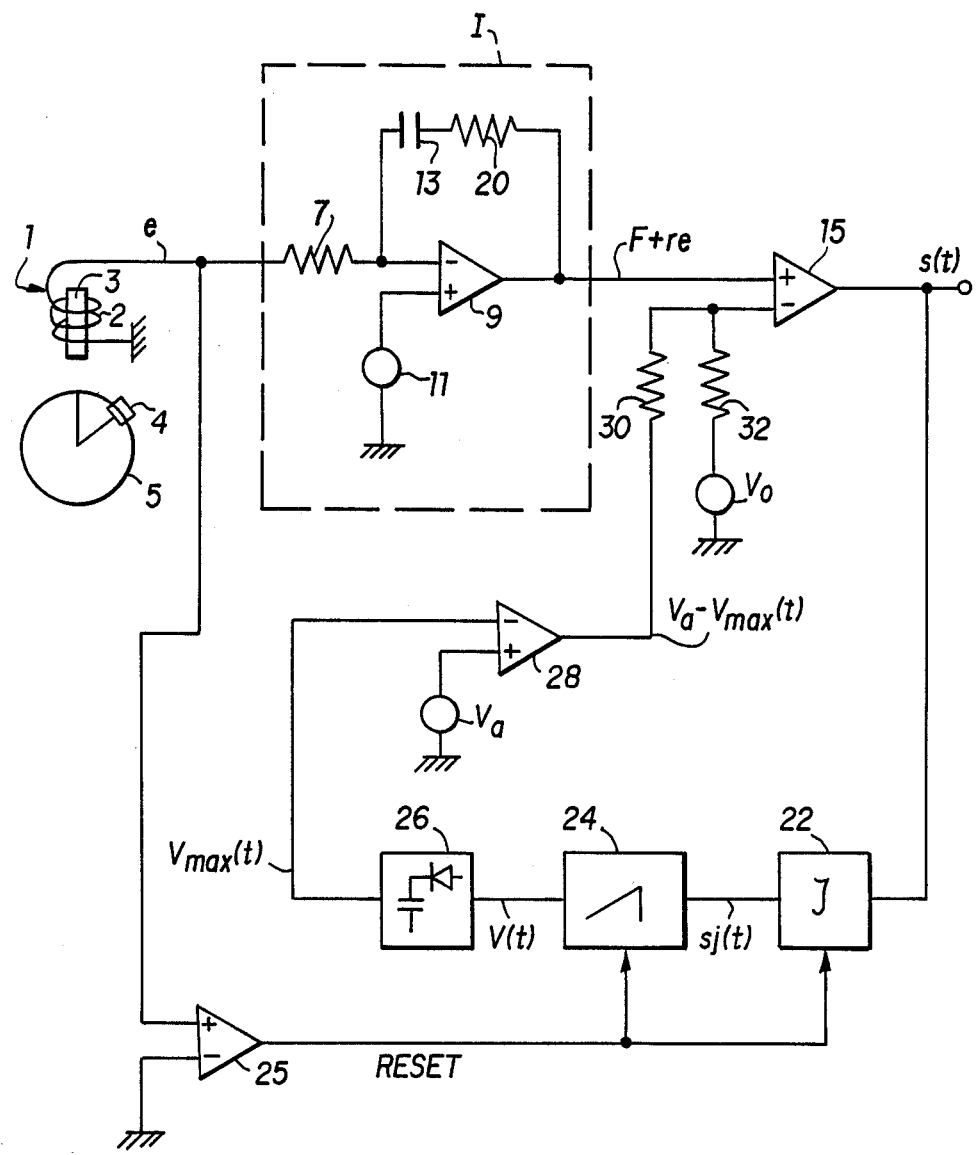
FIG. 3 schematically shows a particular embodiment of the instant invention.

The instant invention, for detecting the angular position of a rotating part, uses a sensor comprising a magnetic circuit, a fixed portion of which, associated to a coil, is arranged in front of a peripheral portion of the rotating part which in turn is integral with a moving magnetic circuit element such as the reluctance of the magnetic circuit is minimum when the moving element is in front of the fixed portion. One accordingly obtains at the output of the coil a voltage such as shown in FIG. 1A.

While the flux in the coil varies, the voltage across this coil is equal to:

$$2 = -dF/dt$$

where F represents the magnetic flux created by the magnetic circuit and entering the coil.

This relationship can be written:

$$edt = -dF.$$

Thus, the integral function of voltage e is:

$$\int edt = -\int dF = -F + \text{constant}$$

With the possible addition of a constant, the time integral of the voltage across the coil depends only upon the magnetic flux entering this coil and does not depend upon the rotation speed of the rotating part.

At a given time, the flux entering the coil depends only upon the magnetic circuit structure and the relative position of the fixed portion with respect to the moving element of this magnetic circuit. Thus, the function F can be directly calibrated with respect to angular positions of the moving element.

Referring to FIG. 2, a device according to the instant invention comprises a sensor 1 made of a coil 2 associated with a magnetic circuit comprising a fixed element 3 and a moving element 4 fixed onto the rotating part 5, the angular position of which is to be determined. One of the elements of the magnetic circuit comprises a magnet. Accordingly, while the moving element 4 rotates, the reluctance of the magnetic circuit varies and the variation of the flux F(t) as a function of time causes the occurrence of a voltage e across the coil. This signal e is shown on a period extending from 0° to 360° in FIG. 1A. This signal e does not permit to simply obtain angular indications other than 0°, due to the fact that its shape and its amplitude vary with the rotation speed.

The output of coil 3 is integrated by an integrator I comprising for example a resistor 7 connected with the inverting input (−) of an operational amplifier 9, the non-inverting input (+) of which is connected to a fixed voltage source 11. The input − of amplifier 9 is connected to its output through a capacitor 13.

The output of integrator I is the signal F, the variation of which, during one period, is shown in FIG. 1B. As explained hereinabove, for a given structure of the magnetic circuit/coil system, the function F versus angle, a, will always have the same shape and the same amplitude on a period from 0° to 360°. This remains true even if the speed varies inside one period. Each value of F is accordingly associated to an angular value (more or less k.360°, k being a natural number) and the signal F can be directly graduated in angles.

If one wishes to obtain a decision signal when a given angular value is attained, it is for example possible, as also shown in FIG. 2, to apply signal F onto the first input (+) of a comparator 15, the second input (−) of which receives a reference voltage from a voltage source $V_0$. Thus, the wished decision signal s(t) is obtained at the output of comparator 15. If wished, it is also possible to provide for a conventional circuit for discriminating the positive and negative edges.

The function F is maximum close to the angular value a=0 (coil in front of the magnet) and is further quickly decreasing. For indicating with precision positions comprised between 0° and 360°, it is possible to multiply the number of fixed portions of magnetic circuits and associated coils. The voltages across the coils can be either added or integrated and separately amplified. If K is the number of the coils, assumed uniformely distributed on the periphery of the rotating part, in the first case the position will be indicated with an incertitude of 360°/K, and in the second case, without ambiguity.

FIG. 1B shows the theoretical shape of the function F. In practice, imperfections in the implementation of the system cause the function F not to be strictly monotonous on a half-period. In order to be able to associate without ambiguity an angle comprised between 0° and 180° (more or less k.180°) to a value of F, it is wishable to correct the function F so that it becomes strictly monotonous. Additionally, by providing means for distinguishing if F attains a given value in a positive or a negative direction, it is possible to suppress the ambiguity between the half-periods (0°, 180°) and (180°, 360°), ± k.360°.

The correction of the non-monotonous feature of the function can be obtained very simply by adding to the signal F a given proportion of the signal e. In practice, it is sufficient to add a portion of e such as, at each point of the resulting sum F+e, the ratio e/F is substantially equal to 1/10.

Another improvement to the system consists in providing for an auto-calibrating device which permits to maintain the accuracy of angular detection whatever be the manufacturing scattering on the coil and the magnet.

Those scatterings cause that different curves F correspond to different magnetic circuit-coil systems. Therefore, if a particular value of the function F is considered, this will correspond to slightly different angles according to the specific magnetic circuit and coil.

To correct this phenomenon, the reference signal applied to the comparator 15 is controlled so that the decision signal s(t) provides a signal equal to an absolute reference.

Let us consider for example a device wherein the positive edge of s(t) triggers a saw-tooth generator, that is a generator providing a time proportional voltage V(t). After a determined delay T, the signal V(t) attains a value $V_1$ that is compared to an absolute reference $V_a$. A ratio of the difference $V_a - V_1$ is added to the reference voltage $V_0$: thus, if $V_a - V_1$ is positive, it means that the signal s(t) arrived too early. By increasing $V_0$, the instant at which F[a(t)] gets over the threshold is delayed and the system is corrected. If $V_a - V_1$ is negative, by lowering $V_0$, the instant at which the signal V(t) increases is advanced and the system is also corrected. The corrected reference $V_0$ will accordingly be permanently set at a value such as the decision signal s(t) appears when the rotating element is at an angle a referenced to an external absolute reference represented by $V_a$ and this is obtained whatever be the scattering of the characteristics of the magnetic circuit/coil system, or whatever be the time variation of those characteristics.

Practically, for having a stable control, the difference $V_a - V_1$ has to be integrated, for example by an RC network, the time constant of which is conventionally calculated by taking into account necessary tradeoffs between stability and time-constant.

The measuring period T can be varied and is determined, for example, by the time interval between the passage of the moving element by angle a and a zero crossing, for which the signal F is maximal. This instant is easily determinable as it corresponds to the extremum of F, that is to the zero crossing of the F time-derivate, that is the voltage e(t) across the coil.

If $V_0$ is corrected so that $V_a - V_1$ remains null, the angle at which the increase of V(t) has to be triggered in order that the signal attains a given value when a=0, whatever be the rotating speed of the element, will be detected. Instead of triggering a voltage V(t), it is possible to trigger a time proportional current I(t). This permits to store a given energy, respectively in a capacitor and in a coil during the time T.

In this case, it is necessary to make another improvement to the system for improving its performance, if the rotating part is subject to accelerations or decelerations.

For example, in case of accelerations, the time $T_a$ between the passage by the angle a, to which is associated the triggering of the decision signal s(t), and the zero crossing will be shorter than the time T between those two events in the absence of acceleration of the element. The signal V(t) or I(t) will therefore not have time enough for attaining the wished value $V_a$ or $I_a$. If, further to the acceleration, the speed gets constant, the servocontrol of $V_1$ on the value $V_a$ will correct this error. It can however be wishable to minimize this error during the first rotation period of the element during which the acceleration appears. For this purpose, a quantity proportional to the speed variation has to be added to the signal F. The signal e(t) being proportional to the rotation speed, a fractional part of e(t) has to be added to F, i.e. the same correction as the one above suggested for avoiding the non-monotonous feature of function F. This correction of the servocontrol is usually designated by the term differential correction.

FIG. 3 shows a circuit permitting to introduce the various improvements disclosed in the above to the angular measurement signal, or decision signal. In FIG. 3, the reference numerals 1 to 15 of FIG. 2 designate the same elements. Thus, the signal e(t) of the coil is integrated by the integrator I and compared to a reference voltage by the comparator 15 for providing a decision signal s(t).

For injecting a portion of the direct signal e of the coil in the integrated signal F, a resistor 20 is serially connected with the capacitor 13 of the integrator. Thus, at the output of amplifier 9, instead of having only the signal F, a signal F+re is obtained, r being a function of the ratio between the input impedance 7 of amplifier 9 and the impedance of the derivation comprising the components 13 and 20.

Additionally, instead of comparing the signal F+re to a fixed reference voltage $V_0$, this reference is servocontrolled so that the device according to the invention operates whatever be the scattering resulting from the value variation of the electronic components and the value variation of the magnetic circuit and associated coil.

This servocontrol is obtained through a circuit comprising a T-type flip-flop 22 receiving the signal s(t) that triggers this flip-flop on its positive edges.

The resulting signal $\bar{s(t)}$ at the output of flip-flop 22 triggers a saw-tooth generator 24 which provides a voltage V(t) (or a current I(t)) proportional to time.

The flip-flop 22 and the saw-tooth generator 24 are reset by a signal RESET which appears when the signal e(t) crosses zero. This event corresponds to the minimum reluctance of the magnetic circuit and is obtained by comparing e(t) to 0 in a comparator 25.

The saw-tooth signal V(t) is applied to a peak detector 26 that provides the signal $V_{max}(t)$.

The difference between $V_{max}(t)$ and a reference voltage $V_a$ provided by a comparator 28 is added to the voltage V0 and is used for providing the signal to which is compared F+re for deciding that the rotating part P has attained a predetermined angular position a.

As is apparent to those skilled in the art, various modifications can be made to the above disclosed preferred embodiments; in particular, various peripheral circuits known in the art of angular electronic detection can be added. Also, the practical implementation of the various electronic functions can be modified; for example, as an integrator circuit, more sophisticated circuits could be used or, on the contrary, a simple resistor-capacitor circuit.

Among the possible applications of the invention, are the flash lamp control for stroboscopy, the DC current motor control, and the internal combustion engine control.

I claim:

1. A method of comparing an absolute angular displacement of a rotating part with a predetermined angular displacement by means of a variable reluctance magnetic circuit comprising a fixed portion (3) associated with a coil (2) and at least one moving element (4) attached to the rotating part, comprising the steps of:
    (a) integrating an output signal of the coil,
    (b) tracing the integrated signal curve for one turn of the rotating part at a constant speed whereby each instantaneous amplitude of the integrated signal corresponds to two instantaneous angular values related respectively as X and (260°−X);
    (c) measuring the instantaneous value of the integrated signal; and
    (d) comparing said value of said integrated signal from step (c) with a threshold value corresponding to said predetermined angular displacement from said integrated signal curve from step (b) and generating a comparison signal in response thereto.

2. An angular comparison device comprising a variable reluctance magnetic circuit comprising a fixed portion (3) associated with a coil (2) and at least a moving element (4) attached to a part (5) rotating in front of the fixed portion, the angular position of which is to be detected, comprising:
    means (I) for integrating a voltage across the coil;
    means for rotating said moving element and generating a calibration curve of integrated voltage versus absolute angular displacement of said rotating part with respect to a reference position;
    means for measuring the instantaneous value of the integrated voltage; and
    means for comparing the measured instantaneous value to a threshold value of integrated voltage from said calibration curve corresponding to said predetermined angular displacement and generating an angular comparison signal in response thereto.

3. A method of comparing an angular displacement with a predetermined angular displacement from a reference position of a rotating part by means of a variable reluctance magnetic circuit comprising a fixed portion (3) associated with a coil (2) and at least one moving element (4) attached to the rotating part, comprising the steps of:
    integrating an output signal from said coil;
    tracing the integrated signal curve for one turn at a constant speed whereby each instantaneous amplitude of the integrated signal corresponds to an instantaneous absolute angular displacement value; and
    comparing the instantaneous value of the integrated signal with a threshold signal value of said integrated signal curve corresponding to said predetermined angular displacement and generating a angular comparison signal in response thereto.

4. A method of comparing an angular displacement with a predetermined angular displacement from a reference position of a rotating part by means of a variable reluctance magnetic circuit comprising a fixed portion (3) associated with a coil (2) and at least one moving element (4) attached to the rotating part, comprising the steps of:
    integrating an output signal of the coil to form an integrated signal;
    rotating said rotating part for one turn at a constant speed while measuring the voltage of said integrated signal;
    recording a relationship between an instantaneous amplitude of said integrated signal and a corresponding instantaneous angular value of said rotating part in response to said rotating step measurements; and comparing an instantaneous value of the integrated signal with a threshold signal value corresponding to said predetermined angular displacement using said recorded relationship and generating a comparison signal in response thereto.

5. An angular comparison device comprising:

a variable reluctance magnetic circuit comprising a fixed portion (3) associated with a coil (2) and a moving element (4) attached to a part (5) rotating in front of the fixed portion, the angular position of which is to be detected;

means (I) for integrating a voltage produced across the coil;

means for measuring the instantaneous value of the integrated voltage (15);

means for providing a calibration curve of the integrated voltage versus absolute angular displacement from a reference position; and means for comparing the instantaneous value to a threshold value corresponding to a predetermined angular displacement determined according to said calibration curve and generating a comparison signal responsive thereto.

6. An angular comparison device according to claim 2, further comprising means (22, 32) for calibrating the integrated voltage curve be servocontrolling the reference voltage resulting from a comparison between a maximum value $V_{max}(t)$ of the integrated voltage signal and an absolute reference voltage ($V_a$).

* * * * *